(12) United States Patent
Titus et al.

(10) Patent No.: US 6,691,846 B2
(45) Date of Patent: Feb. 17, 2004

(54) OVER-RUNNING CLUTCH PULLEY WITH SHORTENED DEPTH

(75) Inventors: Barry C. Titus, Chelsea, MI (US); Randall King, Jackson, MI (US); Jared I. Taketa, Livonia, MI (US); Russell E. Monahan, Ann Arbor, MI (US)

(73) Assignee: NTN Corporation, Osaka (JP)

( * ) Notice: Subject to any disclaimer, the term of this patent is extended or adjusted under 35 U.S.C. 154(b) by 7 days.

(21) Appl. No.: 09/997,583

(22) Filed: Nov. 29, 2001

(65) Prior Publication Data

US 2003/0098214 A1 May 29, 2003

(51) Int. Cl.[7] .......................... F16D 13/12; F16S 41/20
(52) U.S. Cl. .................. 192/41 S; 192/75; 192/109 R; 192/81 C
(58) Field of Search .............................. 192/41 S, 75, 192/109 R, 81 C; 188/77 W

(56) References Cited

U.S. PATENT DOCUMENTS

| | | | | | |
|---|---|---|---|---|---|
| 2,274,873 A | * | 3/1942 | Starkey | ..................... | 192/41 S |
| 2,633,953 A | * | 4/1953 | Gorske | ......................... | 192/75 |
| 2,968,380 A | * | 1/1961 | Sacchini et al. | ............... | 192/75 |
| 3,019,871 A | * | 2/1962 | Sauzedde | ................... | 192/41 S |
| 4,502,578 A | * | 3/1985 | Koyama | .................... | 192/81 C |
| 5,314,053 A | * | 5/1994 | Nishimura | ................. | 192/41 S |
| 5,375,643 A | * | 12/1994 | Rude | ......................... | 192/41 S |
| 5,598,913 A | | 2/1997 | Monahan | | |

* cited by examiner

Primary Examiner—Rodney H. Bonck
Assistant Examiner—Eric M. Williams
(74) Attorney, Agent, or Firm—Brinks Hofer Gilson & Lione

(57) ABSTRACT

The over-running clutch pulley of a preferred embodiment of the invention includes a sheave member, a hub member located substantially concentrically within the sheave member, a spring member, and a stop surface, which cooperate to rotationally engage an input device and an output device. The sheave member preferably includes a sheave input section adapted to the engage the input device, and a sheave clutch section defining a sheave clutch surface. Similarly, the hub member preferably includes a hub output section adapted to engage the output device, and a hub clutch section defining a hub clutch surface. The stop surface functions to engage the spring member and to transfer some torque from the sheave member to the hub member during the acceleration of the sheave member in the first rotational direction relative the hub member.

23 Claims, 5 Drawing Sheets

US 6,691,846 B2

OVER-RUNNING CLUTCH PULLEY WITH SHORTENED DEPTH

TECHNICAL FIELD

This invention relates generally to devices in the over-running clutch field, and more specifically to an improved over-running clutch pulley for use with an accessory device driven by an automotive engine with a belt drive.

BACKGROUND

During the operation of an automotive engine, a drive belt is typically used to power and operate various accessory devices. One of these accessory devices is typically an automotive alternator, which provides electrical power to the automobile. While several arrangements of drive belts are in use, the serpentine arrangement, which drives several accessory devices, is currently most favored. Serpentine arrangements typically include a drive pulley connected to the crankshaft of the engine (the "output device") and a drive belt trained about the drive pulley. The drive belt is also trained about one or more conventional driven pulleys, which are connected to the input shafts of various accessories devices (the "input device").

Most conventional driven pulleys are made from a one-piece design with no over-running capabilities. In other words, the conventional driven pulleys are rigidly mounted to the input shaft and are incapable of allowing relative rotational movement between any section of the driven pulley and the input shaft. As a result of the lack of any over-running capabilities and of the generation of significant inertia by the accessory, relative slippage between the drive belt and the driven pulley may occur if the drive belt suddenly decelerates relative to the input shaft. The relative slippage may cause an audible squeal, which is annoying from an auditory standpoint, and an undue wear on the drive belt, which is undesirable from a mechanical standpoint.

In a typical driving situation, the drive belt may experience many instances of sudden deceleration relative to the input shaft. This situation may occur, for example, during a typical shift from first gear to second gear under wide open throttle acceleration. This situation is worsened if the throttle is closed or "backed off" immediately after the shift. In these situations, the drive belt decelerates very quickly while the driven pulley, with the high inertia from the accessory device, maintains a high rotational speed, despite the friction between the drive belt and the driven pulley.

In addition to the instances of sudden deceleration, the drive belt may experiences other situations that cause audible vibration and undue wear. As an example, a serpentine arrangement with conventional driven pulleys may be used with an automobile engine that has a low idle engine speed (which may increase fuel economy). In these situations, the arrangement typically experiences "belt flap" of the drive belt as the periodic cylinder firing of the automotive engine causes the arrangement to resonate within a natural frequency and cause an audible vibration and an undue wear on the drive belt.

The disadvantage of the conventional driven pulleys, namely the audible squeal, the undue wear, and the vibration of the drive belt, may be avoided by the use of an over-running clutch pulley instead of the conventional driven pulley. An over-running clutch pulley allows the pulley to continue to rotate at the same rotational speed and in a same rotational direction after a sudden deceleration of the drive belt. In a way, the over-running clutch pulley functions like the rear hub of a typical bicycle; the rear hub and rear wheel of a conventional bicycle continue to rotate at the same rotational speed and in the same rotational direction even after a sudden deceleration of the pedals and crankshaft of the bicycle. An example of an over-running clutch pulley is described in U.S. Pat. No. 5,598,913 issued to the same assignee of this invention and hereby incorporated in its entirety by this reference.

Since many automobile manufacturers are building automobiles with larger and more powerful engines, but with smaller and more aerodynamic engine compartments, there is a need in the automotive field, if not in other fields, to create an over-running clutch pulley with a shortened depth.

DETAILED DESCRIPTION OF THE PREFERRED EMBODIMENTS

The following description of three preferred embodiments of the invention is not intended to limit the scope of this invention to these preferred embodiments, but rather to enable any person skilled in the art of over-running clutches to make and use this invention.

Figure 1:
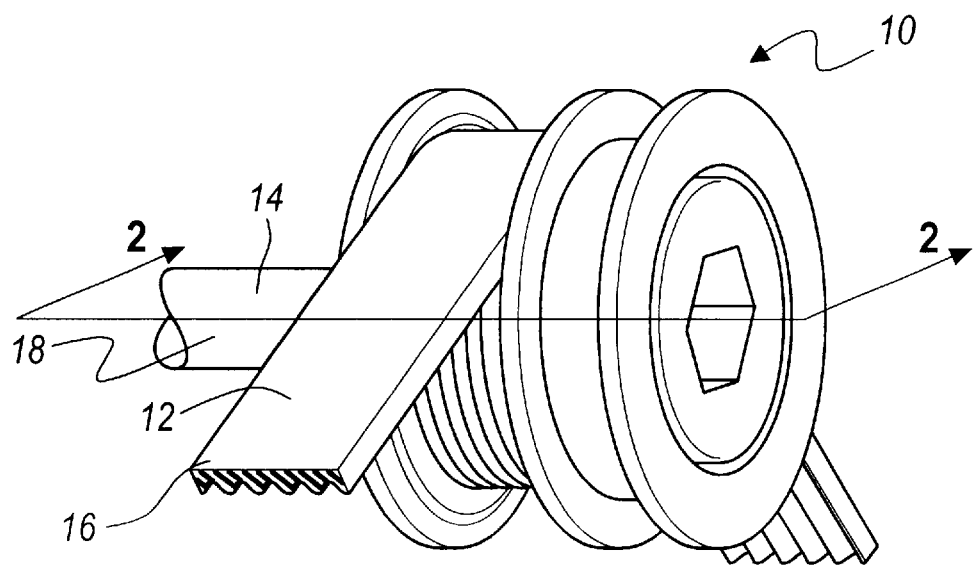
FIG. 1 is a perspective view of an over-running clutch pulley of the invention, shown with a drive belt as the input device and a cylindrical shaft as the output device.

As shown in FIG. 1, the invention includes an over-running clutch pulley 10 for rotationally engaging an input device 12 and an output device 14. The over-running clutch pulley 10 has been designed for use with a drive belt 16 as the input device 12, and with a cylindrical shaft 18 as the output device 14. More specifically, the over-running clutch pulley 10 has been particularly designed for use with a drive belt 16 with a multi-grooved surface and a cylindrical shaft 18 of an automotive alternator. The over-running clutch pulley 10 may be used, however, in other environments, with other suitable input devices, such as smooth belt, a toothed belt, a V-shaped belt, or even a toothed gear, and with other suitable output devices, such as a polygonal shaft. Furthermore, the over-running clutch pulley 10 may be used in an environment with two devices that alternate their rotational input responsibilities, and in an environment with an "output device" that actually provides rotational input and with an "input device" that actually receives rotational input. In these alternative embodiments, the terms "input device" and "output device" are interchangeable.

Figure 2:
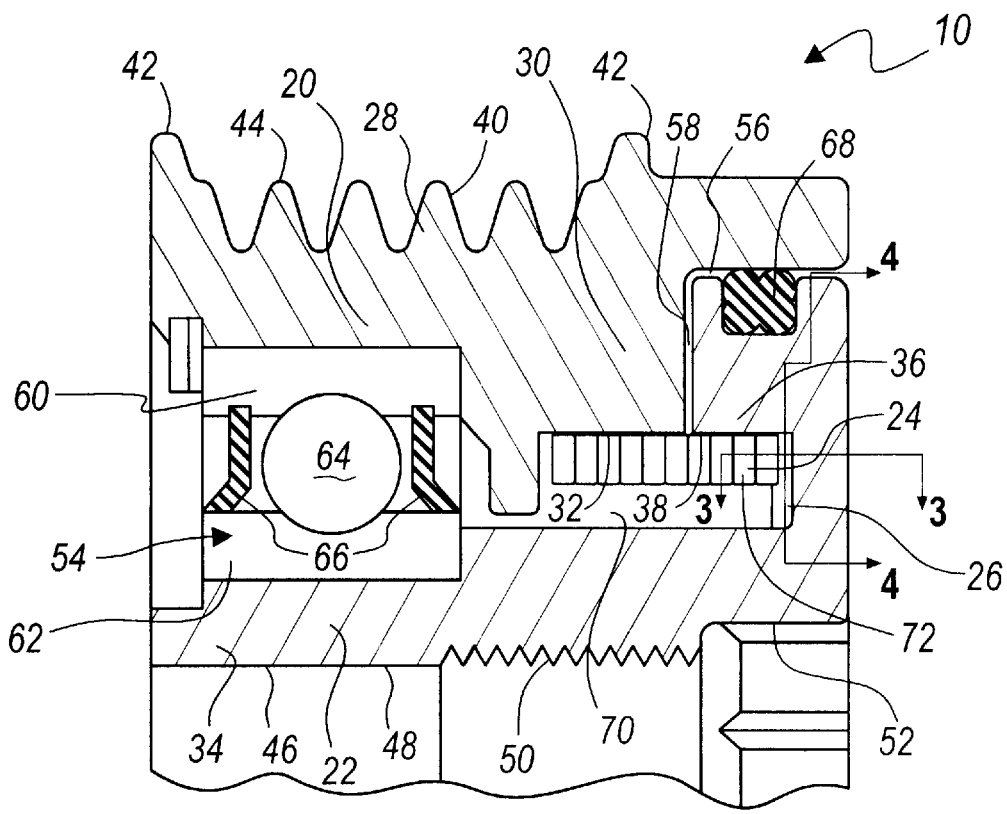
FIG. 2 is a partial cross-section view, taken along the line 2—2 of FIG. 1, of the over-running clutch pulley of a first preferred embodiment.

As shown in FIG. 2, the over-running clutch pulley 10 of the first preferred embodiment includes a sheave member 20, a hub member 22 located substantially concentrically within the sheave member 20, a spring member 24, and a stop surface 26, which cooperate to rotationally engage the drive belt and the cylindrical shaft. The sheave member 20 preferably includes a sheave input section 28 adapted to the engage the input device, and a sheave clutch section 30 defining a sheave clutch surface 32. Similarly, the hub member 22 preferably includes a hub output section 34 adapted to engage the output device 14, and a hub clutch section 36 defining a hub clutch surface 38. The stop surface 26 on the hub member 22 functions to engage the spring member 24 and to transfer some torque from the sheave member 20 to the hub member 22 during the acceleration of the sheave member 20 in the first rotational direction relative the hub member 22. As discussed below, the stop surface 26 allows a reduction in the number of individual wraps of the spring member 24, which thereby allows a shortened depth for the over-running clutch pulley 10. The over-running clutch pulley 10 of alternative embodiments may include other elements, such as an end cap to substantially prevent passage of dirt into and grease out of the over-running clutch pulley 10, or any other suitable elements that do not substantially interfere with the functions of the sheave member 20, the hub member 22, the spring member 24, and the stop surface 26.

The sheave input section 28 of the sheave member 20 of the first preferred embodiment functions to engage the drive belt. To substantially prevent rotational and axial slippage of the sheave member 20 and the drive belt, the sheave input section 28 preferably defines a sheave input surface 40 with two sheave input shoulders 42 and at least one sheave input groove 44. The sheave input section 28 may alternatively define other suitable surfaces, such as toothed surfaces or ribbed surfaces, to engage the input device. The sheave input surface 40 is preferably outwardly directed (away from the rotational axis of the over-running clutch pulley 10) and is preferably substantially cylindrically shaped. The sheave input section 28 is preferably made from conventional structural materials, such as steel, and with conventional methods, but may alternatively be made from other suitable materials and from other suitable methods.

The hub output section 34 of the hub member 22 of the first preferred embodiment functions to engage the cylindrical shaft. The hub output section 34 preferably defines a hub output surface 46 with a smooth section 48 (which functions to ease and center the assembly of the over-running clutch pulley 10 onto the cylindrical shaft), a threaded section 50 (which functions to substantially prevent rotation and to axially retain the hub member 22 to the cylindrical shaft), and a hexagonal section 52 (which functions to mate with an alien wrench for easy tightening and loosening of the over-running clutch pulley 10 onto and off of the cylindrical shaft). Of course, the hub output section 34 may include other suitable devices or define other surfaces to prevent rotational and axial slippage, to engage the cylindrical shaft, and to engage a tool for tightening or loosening the over-running clutch pulley 10 onto and off of the cylindrical shaft. The hub output surface 46 is preferably inwardly directed (toward the rotational axis of the over-running clutch pulley 10) and is preferably substantially cylindrically shaped. The hub output section 34 is preferably made from conventional structural materials, such as steel, and with conventional methods, but may alternatively be made from other suitable materials and from other suitable methods.

The over-running clutch pulley 10 of the first preferred embodiment also includes a bearing member 54, which functions to provide a radial gap 56 and an axial gap 58 between the sheave member 20 and the hub member 22. The radial gap 56 and the axial gap 58 allow relative rotational movement of the sheave member 20 and the hub member 22. The bearing member 54, which is preferably a rolling element type, preferably includes an outer race element 60 preferably press-fit mounted on the sheave member 20, an inner race element 62 preferably press-fit mounted on the hub member 22, ball bearing elements 64 preferably located between the outer race element 60 and the inner race element 62, and bearing seals 66 preferably extending between the outer race element 60 and the inner race element 62 on either side of the ball bearing elements 64. The bearing member 54 may alternatively be of other suitable types, such as a journal bearing or a roller bearing, may alternatively include other suitable elements, and may alternatively be mounted in other suitable manners. The bearing member 54 is a conventional device and, as such, is preferably made from conventional materials and with conventional methods, but may alternatively be made from other suitable materials and with other suitable methods.

The over-running clutch pulley 10 of the first preferred embodiment also includes a sealing member 68, which functions to protect the spring member 24 from contaminates and to seal any lubrication within the over-running clutch pulley 10. The sealing member 68 is preferably made from conventional materials and with conventional methods, but may be made from any suitable materials and with any suitable methods.

The sheave clutch section 30 and the hub clutch section 36 of the first preferred embodiment function to provide the sheave clutch surface 32 and the hub clutch surface 38, respectively, for the engagement with the spring member 24. The sheave clutch section 30 preferably extends radially inward from the sheave member 20. In this manner, the sheave clutch section 30 is preferably made from the same material and with the same methods as the sheave input section 28, but may alternatively be made from other suitable materials and with other suitable methods. The hub clutch section 36 preferably extends radially outward from and axially over the hub output section 34. In this manner, the hub clutch section 36 is preferably made from the same material and with the same methods as the hub output section 34, but may alternatively be made from other suitable materials and with other suitable methods and physical designs. The hub clutch section 36 preferably partially defines a closed clutch cavity 70 to contain the spring member 24.

In the first preferred embodiment, the sheave clutch surface 32 and the hub clutch surface 38 are located substantially adjacent with the axial gap 58 between each other. The sheave clutch surface 32 and the hub clutch surface 38 are preferably inwardly directed (toward the rotational axis of the over-running clutch pulley 10) and are preferably substantially cylindrically shaped. These features allow optimum performance of the spring member 24. The sheave clutch surface 32 and the hub clutch surface 38 may alternatively have differences with each other on these, or other, design specifications.

The spring member 24 of the first preferred embodiment functions to engage the sheave clutch surface 32 and the hub clutch surface 38 upon the acceleration of the sheave member 20 in a first rotational direction relative to the hub member 22, and to disengage the sheave clutch surface 32 and the hub clutch surface 38 upon the deceleration of the sheave member 20 in the first rotational direction relative to the hub member 22. In the preferred embodiment, the spring member 24 is a coil spring 72. The coil spring 72, which is made from conventional materials and with conventional methods, accomplishes the above features by the particular size and orientation of the coil spring 72 within the closed clutch cavity 70. In alternative embodiments, the spring member 24 may include other suitable devices that accomplish the above features.

The coil spring 72 is preferably designed with a relaxed spring radial diameter that is sized slightly greater than an inner diameter of the sheave clutch surface 32 and the hub clutch surface 38. Thus, when inserted into the closed clutch cavity 70 and when experiencing no rotational movement of the sheave member 20 or the hub member 22, the coil spring 72 frictionally engages with and exerts an outward force on both the sheave clutch surface 32 and the hub clutch surface 38. Further, the coil spring 72 is preferably oriented within the closed clutch cavity 70 such that the individual wraps extend axially in the first rotational direction from the sheave clutch surface 32 to the hub clutch surface 38. With this orientation, relative rotational movement of the sheave member 20 and the hub member 22 will result in an unwinding or winding of the coil spring 72. In other words, acceleration of the sheave member 20 in the first rotational direction relative to the hub member 22 will bias an unwinding of the coil spring 72 and deceleration of the sheave member 20 in the first rotational direction relative to the hub member 22 will bias a winding of the coil spring 72.

The unwinding of the coil spring 72 tends to increase the outward force of the individual wraps of the coil spring 72 on the sheave clutch surface 32 and the hub clutch surface 38. When several wraps of the coil spring 72 are in full frictional engagement with the sheave clutch surface 32, and when several wraps of the coil spring 72 are in full frictional engagement with the hub clutch surface 38, the sheave member 20 is engaged, or "locked" with the hub member 22 and torque is transferred from the sheave member 20 to the hub member 22. This engagement condition preferably occurs upon the acceleration of the sheave member 20 in the first rotational direction relative to the hub member 22. On the other hand, the winding of the coil spring 72 tends to decrease the outward force of the coil spring 72 on the sheave clutch surface 32 and the hub clutch surface 38, thereby allowing disengagement, or "slip", of the sheave member 20 and the hub member 22. This disengagement condition preferably occurs upon the deceleration of the sheave member 20 in the first rotational direction relative to the hub member 22.

The stop surface 26 functions to engage the coil spring 72 and to transfer some torque from the sheave member 20 to the hub member 22 during the acceleration of the sheave member 20 in the first rotational direction relative the hub member 22. In this manner, the stop surface 26 allows a reduction in the number of individual wraps of the coil spring 72 necessary to achieve full frictional engagement. For this reason, in the first preferred embodiment, the coil spring 72 overlaps the sheave clutch surface 32 for a greater distance than the coil spring 72 overlaps the hub clutch surface 38, which allows a shortened depth for the over-running clutch pulley 10. In other words, by replacing several wraps of the coil spring 72 with the stop surface 26, the hub member 20 may be designed with a shortened axial length. In alternative embodiments, the coil spring 72 may overlap the sheave clutch surface 32 for the same distance (or for a lesser distance) than the coil spring 72 overlaps the hub clutch surface 38. The amount of torque transferred by the stop surface 26 is preferably small compared to the amount of torque transferred by the individual wraps of the coil spring 72 against the sheave clutch surface 32 and the hub clutch surface 38. The amount of torque transferred by the stop surface 26 may, however, vary depending on the application and use of the over-running clutch pulley 10.

Figure 3:
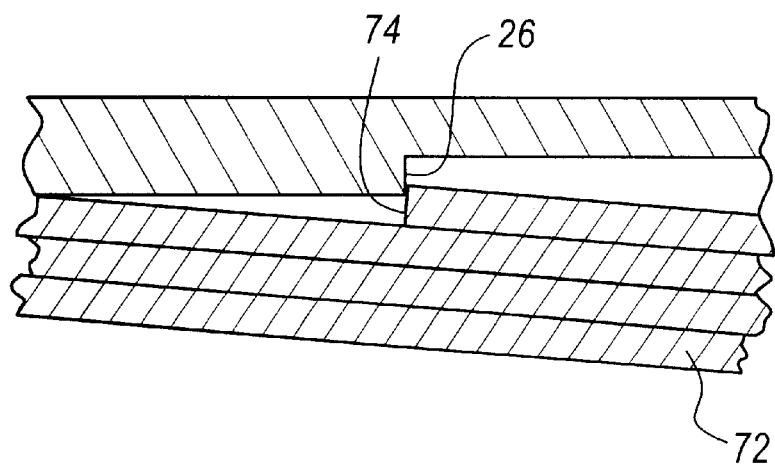
FIG. 3 is a partial cross-sectional view, taken along the line 3—3 of FIG. 2, of the over-running clutch pulley of the first preferred embodiment.

As shown in FIG. 3, the coil spring 72 of the first preferred embodiment includes a spring end 74. The spring end 74 functions to provide an engagement surface for the stop surface 26 and, in this manner, preferably has a generally planar shape, but may alternatively have other suitable shapes. The stop surface 26, which functions to engage the spring end 74, also preferably has a generally planar shape, but may alternatively have other suitable shapes. The stop surface 26 and the spring end 74, in addition to preferably having a generally planar shape, also preferably have near-flush engagement. The near-flush engagement preferably provides a reliable rotational engagement between the spring member 72 and the stop surface 26 and an adequate torque transfer between the sheave member and the hub member. The stop surface 26 and the spring end 74 may, of course, have other suitable arrangements.

Figure 4:
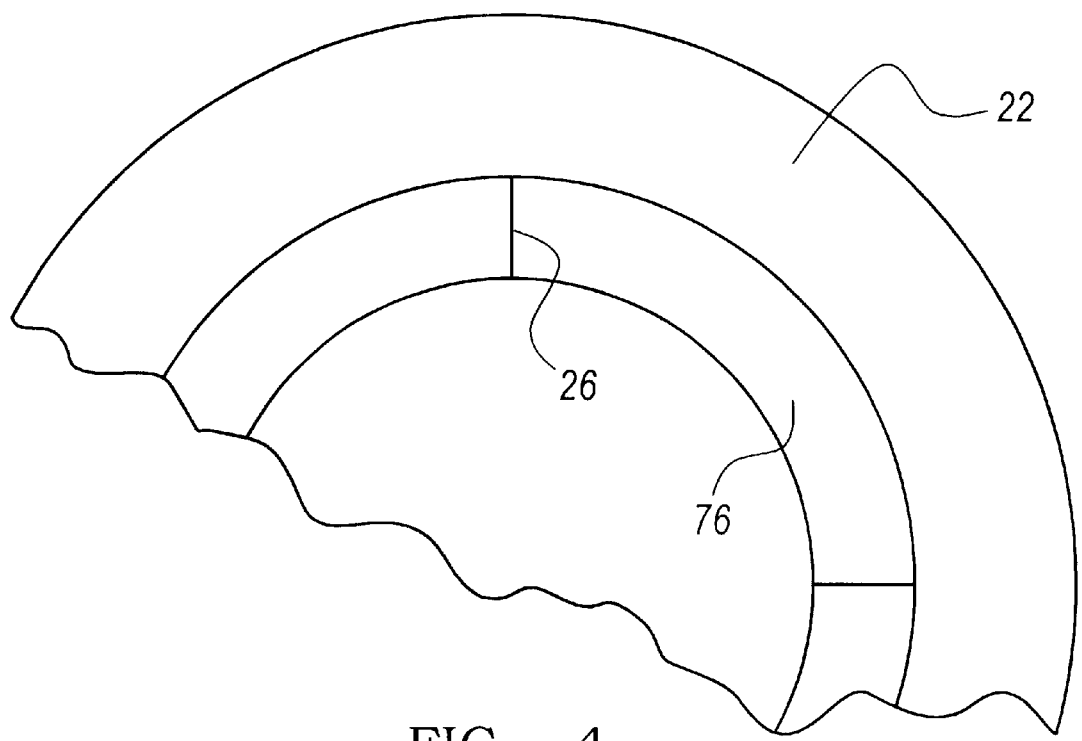
FIG. 4 is a partial cross-sectional view, taken along the line 4—4 of FIG. 2, of the over-running clutch pulley of the first preferred embodiment.

As shown in FIG. 4, in the first preferred embodiment, the hub member 22 defines the stop surface 26 as a portion of an arcuate slot 76. The arcuate slot 76 is preferably machined after the formation of the hub member 22, but may alternatively be initially formed within the hub member 22. The arcuate slot 76 preferably spans approximately 90° around the hub member 22, but may alternatively span more or less than 90° depending on the pitch and thickness of the coil spring.

Figure 5:
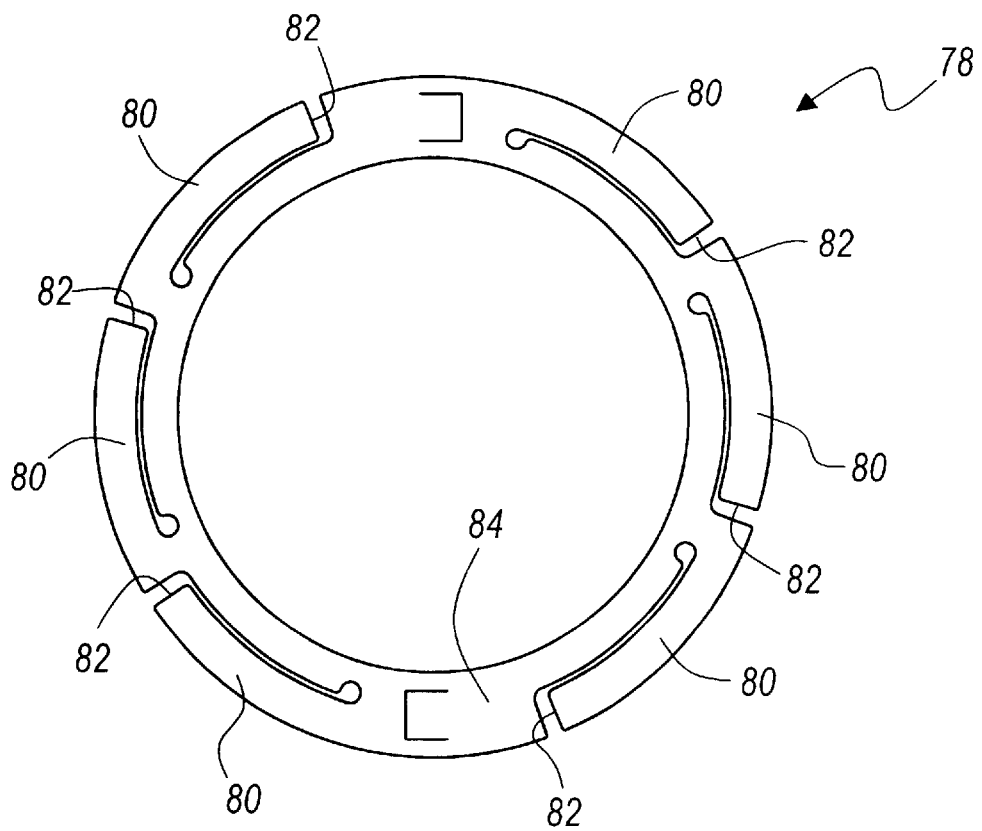
FIG. 5 is a front view of the stop member of the over-running clutch pulley of the second preferred embodiment.
Figure 6:
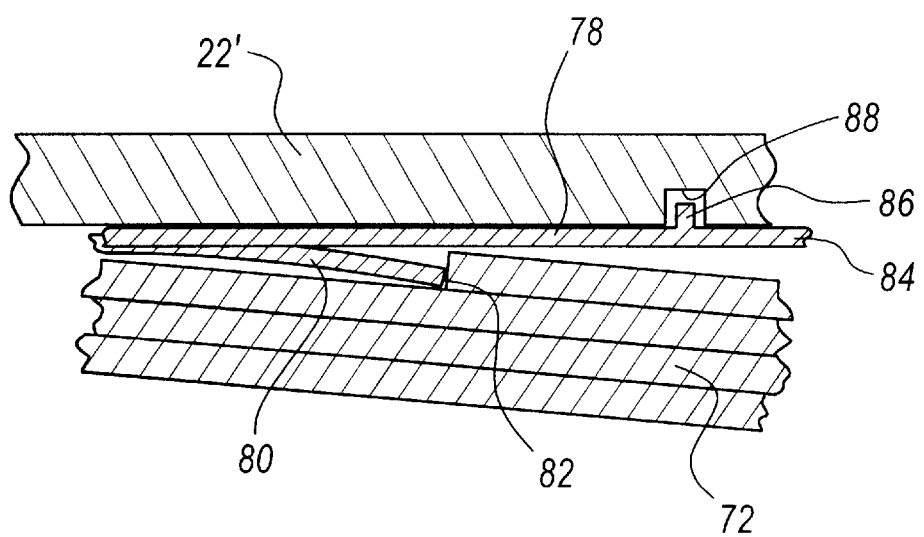
FIG. 6 is a partial cross-sectional view, similar to FIG. 3, of the over-running clutch pulley of the second preferred embodiment.

As shown in FIG. 5, the over-running clutch pulley of the second preferred embodiment also includes a stop member 78. The stop member 78 preferably includes at least one finger section 80 preferably defining a stop edge 82 and preferably projecting radially the stop member 78 and axially toward the coil spring 72, as shown in FIG. 6. In this manner, the stop edge 82 preferably acts as the stop surface 26. Further, in this manner, the finger section 80 preferably acts like a spring, which preferably allows the coil spring 72 to slip over the finger section 80 in one rotational direction and engage the stop edge 82 in the other rotational direction. The finger section 80 also preferably provides a slight bias of the stop member 78 against the coil spring 72.

The stop member 78 of the second preferred embodiment also preferably includes at least one axial projection 86, which preferably functions to engage an axial cavity 88 within the hub member 22'. The axial cavity 88 is preferably stamped or punched after the formation of the hub member 22', but may alternatively be initially forged within the hub member 22'. The axial projection 86 of the stop member 78 and the axial cavity 88 of the hub member 22' function to provide rotational engagement of the stop member 78 and the hub member 22'. In alternative embodiments, other suitable devices or methods, such as adhesives or other suitable fasteners, may provide rotational engagement of the stop member 78 and the hub member 22'. The stop member 78 is preferably made from a structural material, such as steel, and stamped and bent from a single sheet. In this manner, the stop member 78 plus the hub member 22' without the machined arcuate slot 76 may provide a cost-preferred alternative to the hub member 22 with the machined arcuate slot 76. The stop member 78 may, however, be made from other suitable materials, such as plastics, and with other suitable methods, such as molding.

Figure 7:
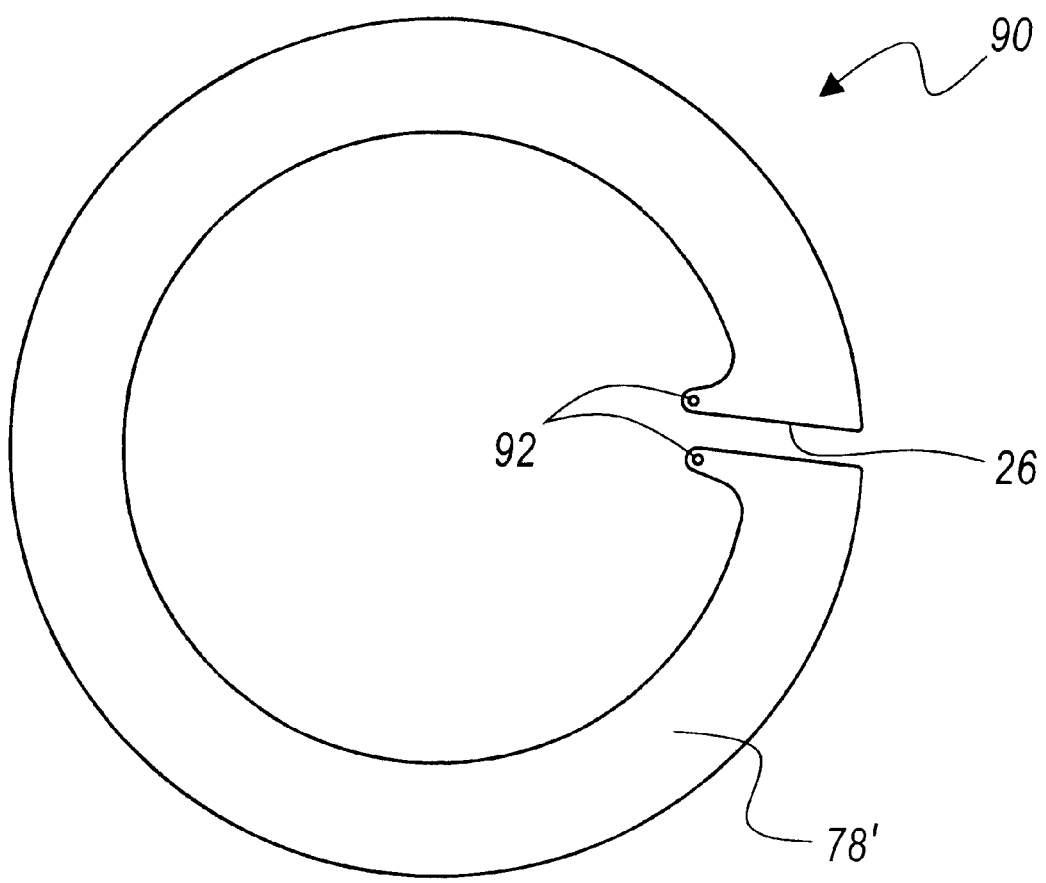
FIG. 7 is a front view of the stop member of the over-running clutch pulley of the third preferred embodiment.

As shown in FIG. 7, the over-running clutch pulley of the third preferred embodiment includes a stop member 78' in the form of a conventional snap ring 90. The snap ring 90 preferably includes eyelets 92, for which function to mate with a tool for insertion of the snap ring 90 within the hub member. The snap ring 90 also preferably includes an axial offset. In other words, one end of the snap ring 90 is preferably axial displaced relative to the other end. In this manner, one of the ends provides the stop surface 26 for rotational engagement with the spring member, similar to the finger section of the stop member of the second preferred embodiment. The snap ring 90, like conventional snap rings, is preferably biased in a radial direction, which preferably provides rotational engagement of the stop member 78 to the hub member 22.

Figure 8:
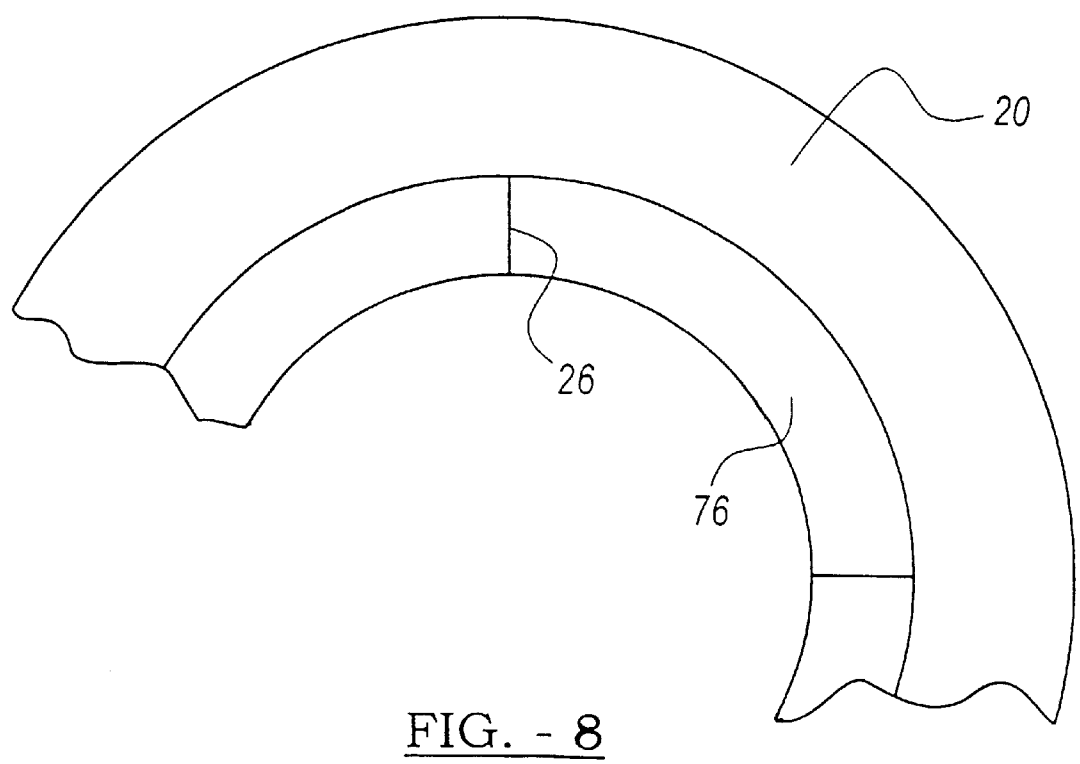
FIG. 8 is a partial cross-sectional view of the over-running clutch pulley of a variation of the first preferred embodiment.

Although the stop surface is coupled to the hub member in the preferred embodiments, the stop surface 26 and the arcuate slot 76 may be coupled to the sheave member 20 in a manner similar to the arcuate slot of the hub member of the first preferred embodiment (as shown in FIG. 8), the stop member of the second or third preferred embodiment, or by any other suitable device or method. Further, the over-running clutch pulley may include a second stop surface, such that the first stop surface is coupled to the hub member and the second step surface is coupled to the sheave member. In this embodiment, the stop surfaces may both be coupled in a manner similar to the arcuate slot of the first preferred embodiment, the stop member of the second or third preferred embodiment, or by any other suitable device or method.

As any person skilled in the art of over-running clutches will recognize from the previous detailed description and from the figures and claims, modifications and changes can be made to the preferred embodiments of the invention without departing from the scope of this invention defined in the following claims.

We claim:

1. An over-running clutch pulley for rotationally engaging an input device and an output device, comprising:
    a sheave member including a sheave input section adapted to engage the input device, and a sheave clutch section defining a sheave clutch surface;
    a hub member located substantially concentrically within said sheave member and including a hub output section adapted to engage the output device, and a hub clutch section defining a hub clutch surface substantially adjacent said sheave clutch surface;
    a spring member adapted to lock against said sheave clutch surface and said hub clutch surface thereby engaging said sheave clutch surface and said hub clutch surface upon the acceleration of said sheave member in a first rotational direction relative said hub member, and to slip against one of said sheave clutch surface and said hub clutch surface thereby disengaging said sheave clutch surface and said hub clutch surface upon the deceleration of said sheave member in the first rotational direction relative said hub member; and
    a stop surface adapted to engage said spring member upon the acceleration of said sheave member in the first rotational direction relative said hub member and adapted to slip over said spring member upon the rotation of said sheave member relative to said hub member in a second rotational direction opposite the first rotational direction.

2. The over-running clutch pulley of claim 1 wherein said spring member includes a spring end, and wherein said stop surface is further adapted to engage said spring end of said spring member.

3. The over-running clutch pulley of claim 1 wherein said hub member defines said stop surface.

4. The over-running clutch pulley of claim 1 wherein said sheave member defines said stop surface.

5. The over-running clutch pulley of claim 1 further comprising a stop member which defines said stop surface.

6. The over-running clutch pulley of claim 5 wherein said stop member includes at least one finger section defining a stop edge and projecting radially and axially such that said spring member slips over said finger section in one rotational direction and engages said stop edge in the other rotational direction.

7. The over-running clutch pulley of claim 6 wherein said stop member is rotationally engaged to said hub member.

8. The over-running clutch pulley of claim 7 wherein said hub member defines at least one axial cavity, wherein said stop member includes at least one axial projection, and wherein said axial projection engages with said axial cavity to provide rotational engagement of said stop member to said hub member.

9. The over-running clutch pulley of claim 7 wherein said spring member overlaps said sheave clutch surface for a greater distance than said spring member overlaps said hub clutch surface.

10. The over-running clutch pulley of claim 7 wherein said stop member is biased in a radial direction to provide rotational engagement of said stop member to said hub member.

11. The over-running clutch pulley of claim 6 wherein said stop member is rotationally engaged to said sheave member.

12. The over-running clutch pulley of claim 11 wherein said sheave member defines at least one axial cavity, wherein said stop member includes at least one axial projection, and wherein said axial projection engages with said axial cavity to provide rotational engagement of said stop member to said sheave member.

13. The over-running clutch pulley of claim 11 wherein said spring member overlaps said hub clutch surface for a greater distance than said spring member overlaps said sheave clutch surface.

14. The over-running clutch pulley of claim 11 wherein said stop member is biased in a radial direction to provide rotational engagement of said stop member to said sheave member.

15. The over-running clutch pulley of claim 1 wherein said sheave input section defines a sheave input surface with two sheave shoulders and several sheave input grooves that cooperate to engage a grooved belt as the input device and to substantially prevent rotational and axial slippage between said sheave input surface and the grooved belt, and wherein said hub output section defines a hub output surface adapted to engage a cylindrical shaft as the output device.

16. The over-running clutch pulley of claim 1 wherein said sheave clutch surface is inwardly directed and cylindrically shaped, and wherein said hub clutch surface is inwardly directed and cylindrically shaped.

17. The over-running clutch pulley of claim 1 further comprising a bearing member located between said sheave member and said hub member, and adapted to allow relative rotational movement of said sheave member and said hub member.

18. An over-running clutch pulley for rotationally engaging an input device and an output device, comprising:
    a sheave member including a sheave input section adapted to engage the input device, and a sheave clutch section defining a sheave clutch surface;
    a hub member located substantially concentrically within said sheave member and including a hub output section adapted to engage the output device, and a hub clutch section defining a hub clutch surface substantially adjacent said sheave clutch surface;

a spring member adapted to lock against said sheave clutch surface and said hub clutch surface thereby engaging said sheave clutch surface and said hub clutch surface upon the acceleration of said sheave member in a first rotational direction relative said hub member, and to slip against one of said sheave clutch surface and said hub clutch surface thereby disengaging said sheave clutch surface and said hub clutch surface upon the deceleration of said sheave member in the first rotational direction relative said hub member, wherein said spring member includes a spring end face having a generally planar shape; and a stop surface adapted to engage said spring end face of said spring member upon the acceleration of said sheave member in the first rotational direction relative said hub member.

19. The over-running clutch pulley of claim 18 wherein said stop surface has a generally planar shape.

20. An over-running clutch pulley for rotationally engaging an input device and an output device, comprising:

a sheave member including a sheave input section adapted to engage the input device, and a sheave clutch section defining a sheave clutch surface;

a hub member located substantially concentrically within said sheave member and including a hub output section adapted to engage the output device, and a hub clutch section defining a hub clutch surface substantially adjacent said sheave clutch surface;

a spring member adapted to lock against said sheave clutch surface and said hub clutch surface thereby engaging said sheave clutch surface and said hub clutch surface upon the acceleration of said sheave member in a first rotational direction relative said hub member, and to slip against one of said sheave clutch surface and said hub clutch surface thereby disengaging said sheave clutch surface and said hub clutch surface upon the deceleration of said sheave member in the first rotational direction relative said hub member;

a first stop surface adapted to engage said spring member upon the acceleration of said sheave member in the first rotational direction relative said hub member and adapted to slip over said spring member upon the rotation of said sheave member relative to said hub member in a second rotational direction opposite the first rotational direction; and a second stop surface adapted to engage said spring member upon the acceleration of said sheave member in the first rotational direction relative said hub member and adapted to slip over said spring member upon the rotation of said sheave member relative to said hub member in a second rotational direction opposite the first rotational direction.

21. The over-running clutch pulley of claim 20 wherein said hub member defines said first stop surface, and wherein said sheave member defines said second stop surface.

22. The over-running clutch pulley of claim 20 further comprising a first stop member which defines said first stop surface, and a second stop member which defines said second stop surface.

23. The over-running clutch pulley of claim 22 wherein said first stop member is rotationally engaged to said hub member, and wherein said second stop member is rotationally engaged to said sheave member.

* * * * *